(12) United States Patent  (10) Patent No.: US 8,370,414 B2
Halvarsson  (45) Date of Patent: Feb. 5, 2013

(54) FFT-BASED PARALLEL SYSTEM WITH MEMORY REUSE SCHEME

(75) Inventor: Stig Halvarsson, Lomma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1058 days.

(21) Appl. No.: 12/354,180

(22) Filed: Jan. 15, 2009

(65) Prior Publication Data

US 2010/0179978 A1  Jul. 15, 2010

(51) Int. Cl.
*G06F 17/40* (2006.01)
*G06F 15/00* (2006.01)

(52) U.S. Cl. ........................................ 708/404
(58) Field of Classification Search ............ 708/404
See application file for complete search history.

(56) References Cited

U.S. PATENT DOCUMENTS

| | | | |
|---|---|---|---|
| 5,034,910 A * | 7/1991 | Whelchel et al. ............ | 708/407 |
| 6,003,056 A * | 12/1999 | Auslander et al. ............ | 708/404 |
| 6,304,887 B1 | 10/2001 | Ju et al. | |
| 2003/0041080 A1 | 2/2003 | Jaber | |
| 2004/0015530 A1 | 1/2004 | Kang | |
| 2005/0102342 A1 | 5/2005 | Greene | |
| 2007/0033244 A1 * | 2/2007 | Cohen et al. ................. | 708/404 |
| 2007/0106718 A1 | 5/2007 | Shum et al. | |

OTHER PUBLICATIONS

Dawoud, D. S.: "New Hardware Implementation of Parallel 1D FFT"; IEEE Africon, 6th Africon Conference in Africa, Oct. 2002, pp. 35-40.

* cited by examiner

*Primary Examiner* — Kuen Lu
(74) *Attorney, Agent, or Firm* — Potomac Patent Group PLLC

(57) ABSTRACT

A method may include storing N number of Fast Fourier Transform (FFT) data points into x-memories, N and x being integers greater than one, and the x-memories having a total memory capacity equivalent to store the N number of FFT data points, and reading K FFT data points of the N number of FFT data points from each of the x-memories so that the N number of FFT data points are read, K being an integer greater than one. The method may further include performing parallel radix-m FFTs on the x*K number of FFT data points, multiplying the x*K number of FFT data points by twiddle factors to obtain resultants, shifting the resultants, and writing back the shifted resultants of the x*K number of FFT data points to the x-memories. The method may also include repeating the reading, the multiplying, the shifting and the writing back until the N number of FFT data points have been completely transformed into an FFT resultant, and where there is x*K number of FFT data points available for processing during every repetition, and outputting the FFT resultant.

20 Claims, 4 Drawing Sheets

Fig. 4

MEM 1
STEP-1: 1, 2, 3, 4, 5, 6, 7, 8, 9, 10, 11, 12
STEP-2: 1, 2, 3, 4, 29, 30, 31, 32, 21, 22, 23, 24

MEM 2
STEP-1: 13, 14, 15, 16, 17, 18, 19, 20, 21, 22, 23, 24
STEP-2: 13, 14, 15, 16, 5, 6, 7, 8, 33, 34, 35, 36

MEM 3
STEP-1: 25, 26, 27, 28, 29, 30, 31, 32, 33, 34, 35, 36
STEP-2: 25, 26, 27, 28, 17, 18, 19, 20, 9, 10, 11, 12

FFT-BASED PARALLEL SYSTEM WITH MEMORY REUSE SCHEME

TECHNICAL FIELD

Implementations described herein relate generally to processing based on Fast Fourier Transforms (FFTs).

BACKGROUND

Typically, signaling processing operations are performed in the time domain or in the frequency domain. A common algorithm to transform time domain data into frequency domain data involves an algorithm called the Fast Fourier Transform (FFT). Existing techniques for performing FFT are based on reducing latency and improving throughput. However, when implemented, these existing techniques under utilize resources (e.g., memory, processing, etc.) when performing FFT. Additionally, these techniques are limited in the utilization of different radixes (e.g., only support FFT sizes dividable by 2).

SUMMARY

It is an object to obviate at least some of the above disadvantages and to improve the process of performing FFT. For example, the embodiments described do not require more memory than the amount of memory needed to store the input data (e.g., FFT data points). Additionally, or alternatively, the embodiments described may reuse the memory by writing back intermediary FFT results. Additionally, or alternatively, embodiments described may utilize any radix.

According to one aspect, a method performed by a device may include storing N number of Fast Fourier Transform (FFT) data points into x-memories, N and x being integers greater than one, and the x-memories having a total memory capacity equivalent to store the N number of FFT data points, reading K FFT data points of the N number of FFT data points from each of the x-memories so that the N number of FFT data points are read, K being an integer greater than one, performing parallel radix-m FFTs on the x*K number of FFT data points, multiplying the x*K number of FFT data points by twiddle factors to obtain resultants, shifting the resultants, writing back the shifted resultants of the x*K number of FFT data points to the x-memories, repeating the reading, the multiplying, the shifting and the writing back until the N number of FFT data points have been completely transformed into an FFT resultant, and where there is x*K number of FFT data points available for processing during every repetition, and outputting the FFT resultant.

According to another aspect, a device may include a memory to store instructions, and a processor to execute the instructions to store N number of Fast Fourier Transform (FFT) data points into x-memories having a total memory capacity equivalent to store the N number of FFT data points, perform parallel radix-m FFTs on the N number of FFT data points stored in the x-memories, perform parallel multiplying of the N number of FFT data points by twiddle factors to obtain results, perform parallel shifting of the results, perform parallel writing of the the shifted results to the x-memories, repeat the parallel radix-m, multiplying, shifting, and writing until the N number of FFT data points have been completely transformed to an FFT result, and where the N number of FFT data points are utilized during every repetition, and output the FFT result.

According to yet another aspect, a computer-readable medium may contain instructions executable by at least one processor of a device. The computer-readable medium may include one or more instructions for storing N number of Fast Fourier Transform (FFT) data points into x-memories having a total memory capacity equivalent to store the N number of FFT data points, one or more instructions for performing parallel radix-m FFTs on the N number of FFT data points stored in the x-memories, one or more instructions for multiplying the N number of FFT data points by twiddle factors to obtain resultants, one or more instructions for shifting the resultants of the multiplied N number of FFT data points, one or more instructions for writing the shifted resultants to the x-memories, one or more instructions for repeating one or more of the performing, the multiplying, the shifting, or the writing until the N number of FFT data points have been transformed into an FFT result, where the N number of FFT data points are utilized during every repetition, and one or more instructions for outputting the FFT result.

BRIEF DESCRIPTION OF THE DRAWINGS

FIG. 4 is a diagram illustrating exemplary FFT data points.

DETAILED DESCRIPTION

The following detailed description refers to the accompanying drawings. The same reference numbers in different drawings may identify the same or similar elements.

The concepts described herein relate to performing FFT and maximum utilization of resources (e.g., memory, processing, etc.). An FFT system may include memory of a size corresponding to the size of the data to be transformed. The FFT system may reuse this memory by outputting intermediary FFT results back into the memory. The FFT system may include a memory address scheme for writing the intermediary FFT results back into the memory until a final FFT result is obtained. In this way, the FFT system may maximize the utilization of memory resources, which is unlike existing FFT systems. The FFT system may support any radix (e.g., radix-2, radix-3, radix-4, radix-5, etc.) which may be used during any FFT iteration. The FFT system may also provide parallel FFT processing of the data in combination with the mixed radix so as to maximize the utilization of processing resources.

Embodiments described herein include an FFT system. Given the expansive nature and applications in which FFT may be implemented, the FFT system described herein may be incorporated in a number of different devices (e.g., network devices (such as base stations, user terminals, or other types of wireless stations), filtering systems, medical devices, signal processing devices, etc.) and may be applicable to a variety of digital signal processing applications and fields (e.g., communication-based applications, image-based applications, biomedical engineering, mechanical engineering, electrical engineering, etc).

Figure 1:
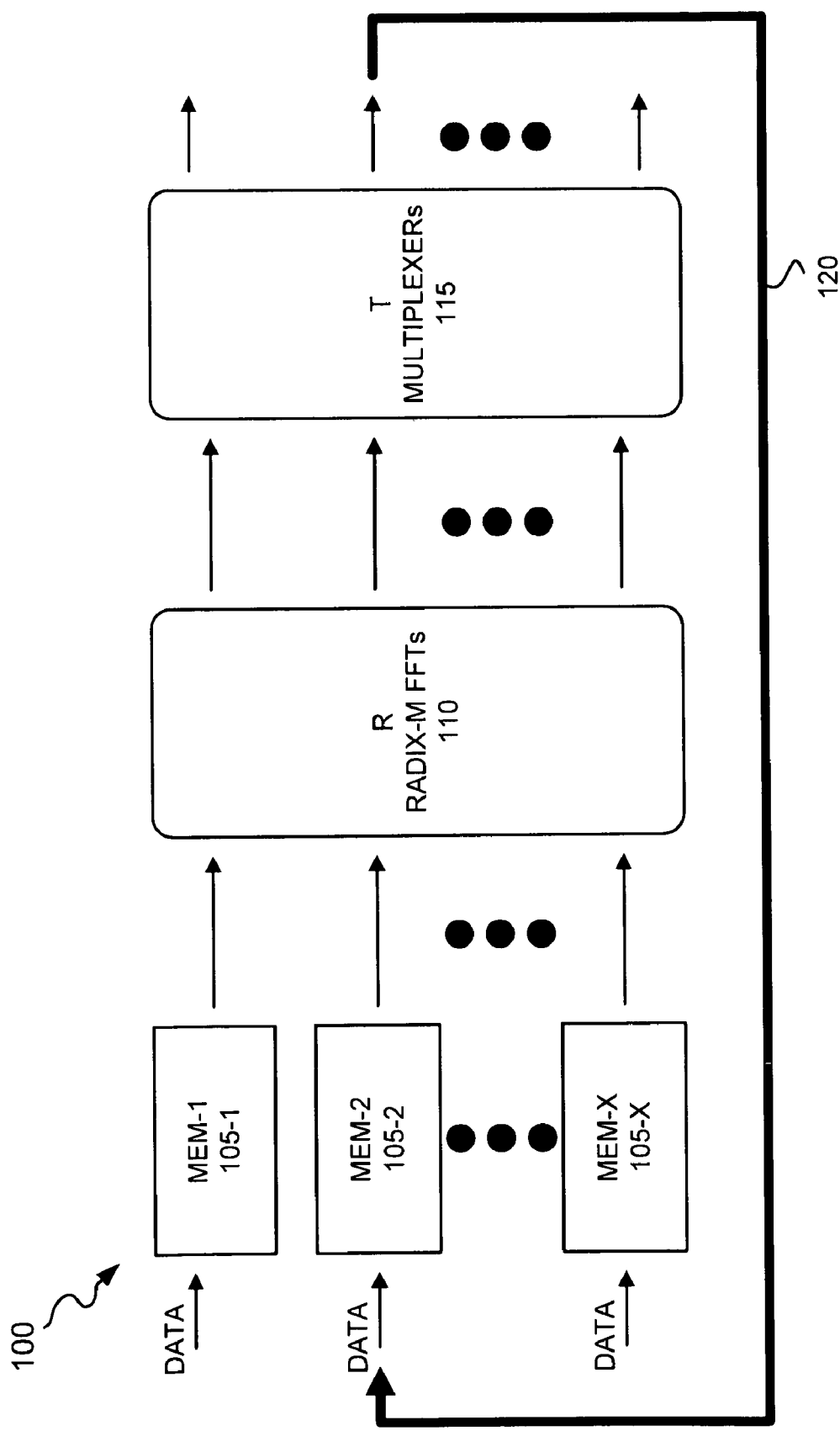
FIG. 1 is a diagram illustrating a FFT system according to the concepts described herein.

FIG. 1 is a diagram illustrating an exemplary FFT system 100 in which methods and/or systems may be implemented. As illustrated, FFT system 100 may include memory 105-1 through memory 105-X (referred to collectively as "memories 105," and generically as "memory 105"), R radix-M FFTs 110 (referred to generically as "radix-M FFT" 110), T multiplexers 115 (referred to generically as "multiplexer" 115), and bus 120.

Memory 105 may include any type of memory. For example, memory 105 may include random access memory (RAM), dynamic RAM (DRAM), static RAM (SRAM), zero capacitor RAM (Z-RAM), or some other type of memory. In one embodiment, memories 105 may correspond to multiple memories 105-1 through 105-X. In other embodiments, memories 105 may correspond to a single memory.

Radix-M FFT 110 may perform an M-based butterfly calculation, where M identifies the radix and corresponds to an integer value, such as, for example, 2, 3, 4, 5 . . . 16, etc. For example, a radix-2 butterfly calculation may operate on two numbers at a time, a radix-32 butterfly calculation may operate on 32 numbers at a time, etc. Depending on the value of M, radix-M FFT 110 may perform various mathematical computations, such as, for example, addition, subtraction, trivial multiplication (e.g., multiple by −1 or i), and/or multiplication (e.g., multiply by twiddle factors (e.g., trigonometric constant coefficients)). Radix-M FFT 110 may perform butterfly operations in conjunction with these various mathematical computations.

Multiplexer 115 may each shift or swap output data from radix-M FFTs 110 to an appropriate memory 105. Bus 120 may be a communication path from multiplexer 115 to memories 105. Bus 120 may include an address bus.

In an exemplary operation, FFT system 100 may receive N points of data (e.g., N integer values) and store the N points of data in memories 105. With knowledge of the number of data points (since memories 105 is of a size equal to store the N points of data), radix-M FFTs 110 may perform M-based butterfly calculations in parallel. Radix-M FFTs 110 may output intermediary FFT results to multiplexers 115. Multiplexers 115 may shift or swap some or all of the N points of data so that the shifted N points of data may be written to a different memory 105 than a preceding FFT iteration. In this way, radix-M FFTs 110 may receive the appropriate data points to perform subsequent radix-M based butterfly calculations. This process may be performed repetitively until a final FFT result is obtained.

As a result of the foregoing, a FFT of data may be performed that maximizes the utilization of resources (e.g., memory, processing). Additionally, or alternatively, the FFT system provides for easy pipelining without any memory location issues and the number of data points to be processed is limited only by memory size.

Figure 2:
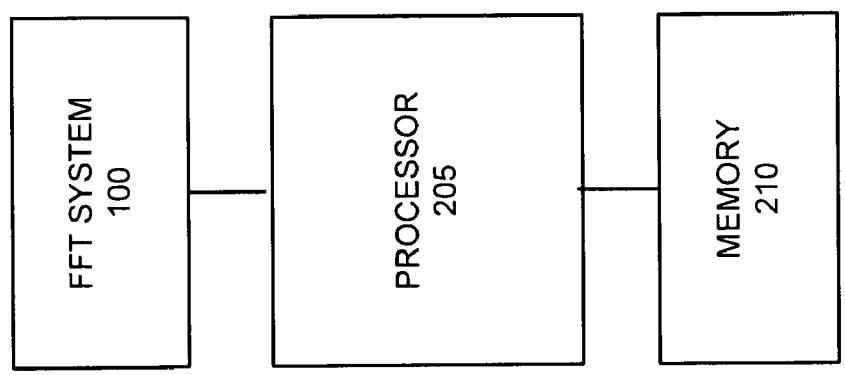
FIG. 2 is a diagram illustrating exemplary components of a device that may include the FFT system of FIG. 1.

FIG. 2 is a diagram illustrating an exemplary device that may include FFT system 100. As illustrated, a device 200 may include a processor 205, memory 210, and FFT system 100.

Processor 205 may interpret and/or execute instructions and/or data. For example, processor 205 may include, a general-purpose processor, a microprocessor, a data processor, a co-processor, a network processor, an application specific integrated circuit (ASIC), a controller, a programmable logic device, a chipset, and/or a field programmable gate array (FPGA). Processor 205 may control the overall (or a portion thereof) operation and use of device 200.

Memory 210 may store information (e.g., data and/or instructions). Memory 210 may include RAM, DRAM, SRAM, a read only memory (ROM), a programmable read only memory (PROM), a flash memory, other types of volatile memory or non-volatile memory, and/or some other form of memory. Memory 210 may include memories 105.

As previously described, FFT system 100 may include memory 105, radix-M FFT 110 and multiplexer 115. Radix-M FFT 110 may be implemented in hardware (e.g., processing logic, such as a processor 205) or a combination of hardware and software.

Although FIG. 2 illustrates components of an exemplary device 200, in other implementations, device 200 may include fewer, additional or different components. For example, device 200 may include storage (e.g., a hard disk with a corresponding drive, or some other form of secondary storage), input and/or output mechanisms, etc. Additionally, or alternatively, in other implementations, device 200 may have a different arrangement or configuration of components than illustrated in FIG. 2.

Figure 3:
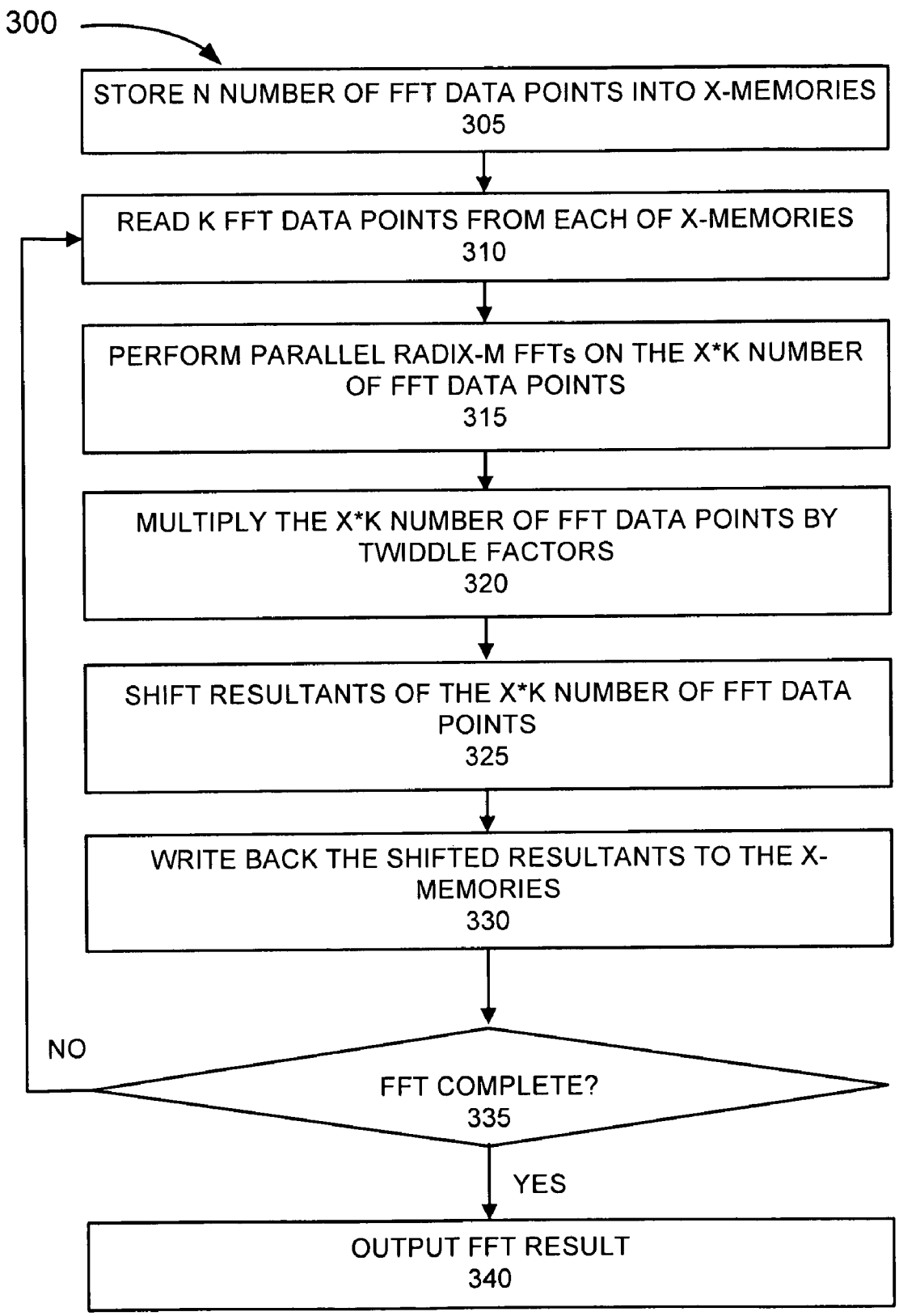
FIG. 3 is a flow diagram illustrating an exemplary process for performing FFT.

As mentioned, embodiments described herein provide for a FFT system that, among other things, maximizes the utilization of resources (e.g., memory, processing, etc.). FIG. 3 is a flow diagram illustrating an exemplary process 300 for performing FFT. The description of process 300 may reference previous figures. Additionally, for purposes of discussion, exemplary data points will be described in reference to FIG. 4.

Process 300 may begin with storing N number of FFT data points into x-memories (block 305). Assume that N FFT data points (e.g., integers 1-36) are stored in memories 105 (e.g., Mem 1, Mem 2, and Mem 3), as illustrated in FIG. 4. For example, K FFT data points 1-12 may be stored in Mem 1, K FFT data points 13-24 may be stored in Mem 2, and K FFT data points 25-36 may be stored in Mem 3. That is, in this example, the integers 1-36 are stored in sequence.

K FFT data points from each of x-memories may be read (block 310). K FFT data points 1-12 may be read from Mem 1, K FFT data points 13-24 may be read from Mem 2, and K FFT data points 25-36 may read from Mem 3, in parallel. In one implementation, x*K is equal to N.

Parallel radix-M FFTs on the x*K number of FFT data points may be performed (block 315). R radix-M FFTs 110 may perform various mathematical computations and/or butterfly operations. The various mathematical computations may include one or more of addition, subtraction, or trivial multiplication.

The x*K number of FFT data points may be multiplied by twiddle factors (block 320). R radix-M FFTs 110 may multiple, in parallel, the x*K number of FFT data points by twiddle factors. However, it will be appreciated that the multiplication of twiddle factors is optional, and may depend on the value of M or the current iteration, typically the last iteration. For example, in some implementations, when the current iteration corresponds to the last iteration, the multiplication by twiddle factors may not be utilized. However, in other implementations, multiplication by twiddle factors may be utilized during the last iteration.

Resultants of the x*K number of FFT data points may be shifted (block 325). T multiplexers 115 may shift, in parallel, the x*K number of FFT data points output by R radix-M FFTs 110. For example, T multiplexers 115 may shift the x*K number of FFT data points based on the current iteration and the current index of the data point.

The shifted resultants are written back to the x-memories (block 330). As illustrated in FIG. 4, in this case, the shifting of some of the N FFT data points may cause these shifted FFT data points to be written to a different memory 105. For example, K FFT data points 1-4, 29-32, 21-24 may be written to Mem 1, K FFT data points 13-16, 5-8, 33-36 may be written to Mem 2, and K FFT data points 25-28, 17-20, 9-12 may be written to Mem 3.

It may be determined whether the FFT is complete (block 335). FFT system 100 may determine whether the FFT is complete based on the number of iterations. Since in each iteration N number of data points is processed, then FFT system 100 may be able to determine when the FFT is complete based on the following expression:

Iterations=log(N)/log(M) if N can be factorized into a single factor

If it is determined that the FFT is not complete (block 335-NO), process 300 may continue by returning to block 310. In some cases, the value of M may change for the next iteration. However, if it is determined that the FFT is complete (block 335-YES), an FFT result may be output (block 340).

Although, FIG. 3 illustrates an exemplary process 300, in other implementations, process 300 may include additional, fewer or different operations than those described. For example, process 300 may include re-ordering the FFT result in a sequential order. Additionally, although the data points have been referred to as FFT data points, in some implementations, the data points may correspond to Inverse FFT (IFFT) data points.

Selection of the appropriate radix may be based on various parameters. For example, radix-4 is the largest FFT size without the need of multiplication. In one implementation, process 300 may be performed utilizing radix-4 for multiple iterations or all iterations except for the last iteration. In other implementations, process 300 may be performed utilizing various radixes (e.g., 2, 3, 4, etc.), as previously described. Additionally, or alternatively, multiplication by twiddle factors may not be performed in a last iteration if Decimation in Frequency (DIF) is used.

The foregoing description of implementations provides illustration, but is not intended to be exhaustive or to limit the implementations to the precise form disclosed. Accordingly, modifications to the concepts, implementations, operations, processes, etc., described herein may be possible. For example, in one implementation, to increase processing utilization when not using radix-4, the data width out from the memories 105 may be set equal to the maximum radix supported by FFT system 100.

FFT system 100 may perform FFT in a manner that maximizes the utilization of resources (e.g., memory, processing, etc.). Additionally, FFT system 100 may perform FFT with minimal latency. For example, FFT system 100 may not need to prepare input data. Rather, the input data may be prepared (e.g., ordering of data points) outside of FFT system 100. Additionally, or alternatively, the ordering of the FFT result may be handled outside of FFT system 100. Additionally, or alternatively, the determination of twiddle factors and/or the factorization of the N data points may be calculated outside FFT system 100. Additionally, or alternatively, memories 105 of FFT system 100 may include any number of memories, but be mapped to look like a different number of memories. For example, 100 memories may be mapped to look like 2 or 5 memories. In this way, the integers x and M may be the same value or may not be the same value.

In addition, while a series of block has been described with regard to the process illustrated in FIG. 3, the order of the blocks may be modified in other implementations. Further, non-dependent blocks may be performed in parallel. It is also to be understood that the process illustrated in FIG. 3 and/or other processes or operations as they have been described herein, may be performed by one or more devices based on instructions stored on a computer-readable medium. The term "computer-readable medium," as used herein, is intended to be broadly interpreted to include, for example, memory, secondary storage (e.g., a hard disk), a compact disc (CD), a digital versatile disc (DVD), or another type of storage medium. Additionally, computer-readable medium may include logical storage (e.g., storing instructions in two or more storing spaces associated with multiple computer-readable mediums).

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

The term "may" is used throughout this application and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items. The term "component," as used herein, is intended to be broadly interpreted to include, for example, software in combination with hardware, or hardware (e.g., a processor 205).

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method performed by a device, comprising:
    storing N number of Fast Fourier Transform (FFT) data points into x-memories, N and x being integers greater than one, and the x-memories having a total memory capacity equivalent to store the N number of FFT data points;
    reading K FFT data points of the N number of FFT data points from each of the x-memories so that the N number of FFT data points are read, K being an integer greater than one;
    performing parallel radix-m FFTs on the x*K number of FFT data points;
    multiplying the x*K number of FFT data points by twiddle factors to obtain resultants;
    shifting the resultants;
    writing back the shifted resultants of the x*K number of FFT data points to the x-memories;
    repeating the reading, the multiplying, the shifting and the writing back until the N number of FFT data points have been completely transformed into an FFT resultant, and where there is x*K number of FFT data points available for processing during every repetition; and
    outputting the FFT resultant.

2. The method of claim 1, where the multiplying is performed in parallel.

3. The method of claim 1, further comprising:
    re-ordering the FFT resultant in a sequential order.

4. The method of claim 1, where m of radix-m changes value for one or more repetitions of the performing.

5. The method of claim 1, where integer m and integer x have a same integer value.

6. The method of claim 1, where the N number of FFT data points correspond to an N number of Inverse FFT (IFFT) data points.

7. The method of claim 1, where x*K is equivalent to N.

8. A device comprising:
a memory to store instructions; and
a processor to execute the instructions to:
store N number of Fast Fourier Transform (FFT) data points into x-memories having a total memory capacity equivalent to store the N number of FFT data points,
perform parallel radix-m FFTs on the N number of FFT data points stored in the x-memories,
perform parallel multiplying of the N number of FFT data points by twiddle factors to obtain results,
perform parallel shifting of the results,
perform parallel writing of the shifted results to the x-memories,
repeat the parallel radix-m, multiplying, shifting, and writing until the N number of FFT data points have been completely transformed to an FFT result, and where the N number of FFT data points are utilized during every repetition, and
output the FFT result.

9. The device of claim 8, where m is equal to four except for a last repetition.

10. The device of claim 8, where, when writing the results, the processor is further configured to:
swap one or more of the N number of FFT data points of the results to a memory of the x-memories that is different than another memory of the x-memories in which the one or more of the N number of FFT data points was stored during a particular repetition.

11. The device of claim 8, where the device includes a wireless station or a user terminal.

12. The device of claim 8, where m of radix-m changes value for one or more repetitions of the parallel performing of radix-m FFTs.

13. The device of claim 12, where m of radix-m changes value to a value that is not dividable by two for at least one repetition.

14. The device of claim 8, where when shifting, not all of the N number of FFT data points are shifted.

15. The device of claim 8, where the shifting is based on a current repetition and current indexes associated with the N number of FFT data points.

16. A non-transitory computer-readable medium containing instructions executable by at least one processor of a device, the computer-readable medium comprising:
one or more instructions for storing N number of Fast Fourier Transform (FFT) data points into x-memories having a total memory capacity equivalent to store the N number of FFT data points;
one or more instructions for performing parallel radix-m FFTs on the N number of FFT data points stored in the x-memories;
one or more instructions for multiplying the N number of FFT data points by twiddle factors to obtain resultants;
one or more instructions for shifting the resultants of the multiplied N number of FFT data points;
one or more instructions for writing the shifted resultants to the x-memories;
one or more instructions for repeating one or more of the performing, the multiplying, the shifting, or the writing until the N number of FFT data points have been transformed into an FFT result, where the N number of FFT data points are utilized during every repetition; and
one or more instructions for outputting the FFT result.

17. The non-transitory computer-readable medium of claim 16, where the shifting is a function of a value of m.

18. The non-transitory computer-readable medium of claim 16, where the N number of FFT data points correspond to an N number of Inverse FFT data points.

19. The non-transitory computer-readable medium of claim 16, where x and m have the same value.

20. The non-transitory computer-readable medium of claim 16, where m of radix-m changes value for one or more repetitions of the repeating.

* * * * *